United States Patent [19]

Marechal

[11] 4,297,912

[45] Nov. 3, 1981

[54] CONTROL DEVICES FOR USE WITH A SHEATHED WIRE OR CABLE

[75] Inventor: Robert Marechal, Paris, France

[73] Assignees: Société Anonyme SICMA - Société Industrielle; Commerciale de Materiel Aeronautique, both of Issoudun, France

[21] Appl. No.: 13,074

[22] Filed: Feb. 21, 1979

[30] Foreign Application Priority Data

Feb. 22, 1978 [FR] France .............................. 78 05785

[51] Int. Cl.³ ............................................ F16C 1/10
[52] U.S. Cl. .................................... 74/501 R; 74/110
[58] Field of Search ...................... 74/501 R, 502, 110

[56] References Cited

U.S. PATENT DOCUMENTS

| 1,218,771 | 3/1917 | Hoeschen et al. | 74/110 |
| 3,589,209 | 6/1971 | Howell | 74/501 |
| 4,031,773 | 6/1977 | Marechal | 74/501.5 R |

Primary Examiner—Kenneth Dorner
Attorney, Agent, or Firm—Karl F. Ross

[57] ABSTRACT

A control device comprises an actuating push button slidable in a housing. A traction element, also slidable in the housing, is secured to the head of a flexible sheathed wire or cable. The traction element has an inclined surface which is engaged by a ball displaced by actuation of the push button whereby to cause displacement of the traction element and of the wire or cable connected thereto.

6 Claims, 5 Drawing Figures

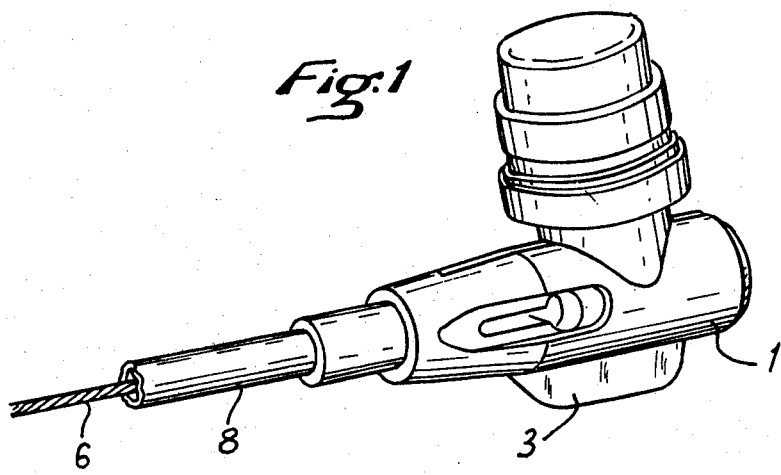
Fig:1
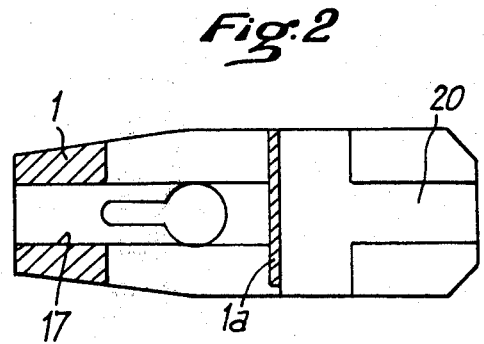
Fig:2
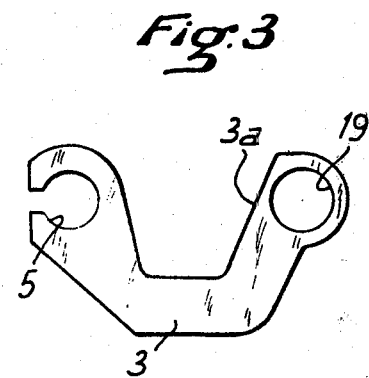
Fig:3
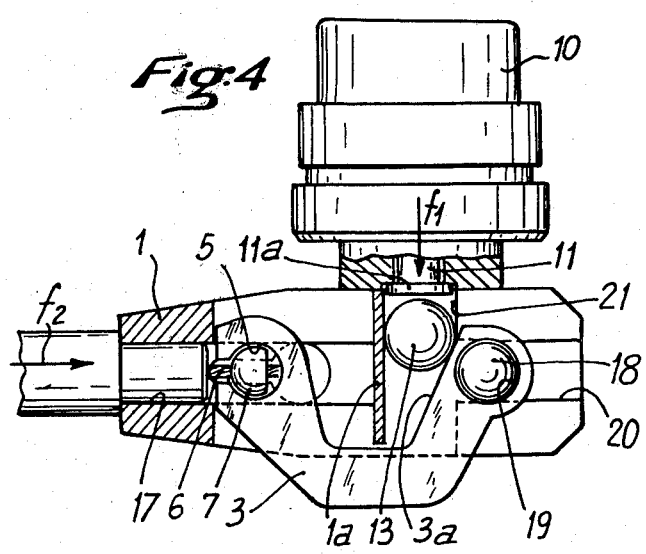
Fig:4
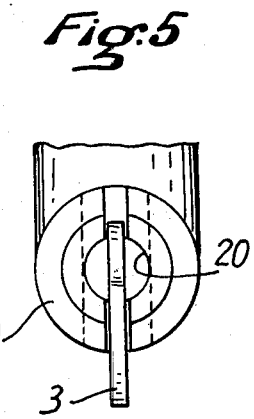
Fig:5

CONTROL DEVICES FOR USE WITH A SHEATHED WIRE OR CABLE

FIELD OF THE INVENTION

The present invention relates to control devices.

BACKGROUND OF THE INVENTION

There has been proposed in U.S. Pat. No. 4,031,773 a control device which comprises a push button actuatable to exert a pull on a flexible control element in the form of a sheathed wire or cable. The push button is slidably installed in a housing, and is rigid with a sloping or frusto-conical part, a ball being interposed between this sloping or frusto-conical part and a slider which is slidably installed in the housing and to which is secured the wire or cable.

OBJECT OF THE INVENTION

An object of the present invention is to provide a control device of the above type which has improved operational characteristics and which is easier to produce.

SUMMARY OF THE INVENTION

According to the present invention, there is provided a control device comprising a housing, a traction element slidable in the housing, the traction element being securable to an elongate control element, and the traction element having means defining an inclined surface, ball means cooperating with the inclined surface, and push button means slidable in the housing and actuatable to cause the traction element to be displaced by interaction between the ball means and the inclined surface.

BRIEF DESCRIPTION OF THE DRAWING

An embodiment of the invention will now be described, by way of example only, with reference to the accompanying diagrammatic drawing, in which:

FIG. 1 is a perspective view of a control device in accordance with the invention;

FIG. 2 is a cross-section through the housing of the device;

FIG. 3 is an elevation of a traction element of the device;

FIG. 4 is another cross-section through the device, with the pushbutton seen in elevation; and FIG. 5 is a fragmentary lateral elevation of the device.

SPECIFIC DESCRIPTION

As shown in the drawing, the device comprises a housing in the form of a barrel 1, and a traction element in the form of a slider 3 which is slidable in the barrel 1. At one of its end portions, the slider 3 has a slot 5 in which can be engaged a part-spherical head 7 of a flexible control element in the form of a wire or cable 6 installed in a sheath 8. The slider 3 is generally U-shaped (see FIG. 3) and is positioned with its opposed limbs on opposite sides of an internal partition 1a of the barrel 1 (see FIG. 4). The device also comprises an actuating pushbutton 10 and a rod 11 rigid with the button.

At one of its end portions, the slider 3 is guided by the head 7 of the cable 6, which head is displaceable in a cylindrical bore 17 of the barrel. At its other end portion, the slider 3 is guided by means of a ball 18 which is engaged in a hole 19 of the slider and in a cylindrical bore 20 of the barrel 1, coaxial with the bore 17. The slider 3 can thus be displaced only along the longitudinal direction of the barrel 1.

The rod 11 of the push button 10 terminates in a retaining head 11a which is displaceable in a bore 21, the axis of which is at right angles to that of the bore 17, 20. The inner surface of the slider 3 comprises a section 3a which is inclined to the axis of the bore 21 and a ball 13 is interposed between the head 11a of the rod 11 and the section 3a.

In an alternative arrangement, the ball 13 may directly engage the push-button 10.

The sheathed wire or cable is connected to a mechanism which is to be controlled, and which, in conventional manner, comprises a return spring. This spring exerts a pull on the cable 6 in a sense to displace the slider 3 in the opposite direction to that of the arrow $f_2$. The ball 13 is thrust back by the inclined section 3a of the slider 3 and held in contact with the retaining head 11a of the rod 11 or at least close to this head.

Upon depression of the pushbutton 10, its head 11a pushes the ball 13 back into the bore 21 whereby the ball 13 acts via the inclined section 3a to thrust the slider 3 in the direction of the arrow $f_2$ along the longitudinal axis of the barrel 1, while being guided by means of the part-spherical head 7 which slides in the bore 17 and the ball 18 which rolls in the bore 20. The slider 3 entrains the cable 6 during this movement.

During this movement, the ball 13 slides while bearing at two points on its periphery, on the one hand on the partition 1a and on the other hand on the inclined section 3a, so that there is practically no friction.

Upon release of the button, the spring of the mechanism which is to be controlled restores the slider 3 to its initial position, its inclined section 3a pushing back the ball 13.

The engagement of the cable to the slider 3 can be performed very easily and quickly, by incorporating an aperture and hole in the barrel 1 as apparent from FIG. 2.

What is claimed is:

1. A control device comprising a housing, a traction element slidable in the housing, said traction element being securable to an elongate control element, and said traction element having means defining an inclined surface, ball means cooperating with said inclined surface, and pushbutton means slidable in the housing and actuatable to cause the traction element to be displaced by interaction between the ball means and said inclined surface, said housing including means defining an internal partition, said traction element being generally U-shaped and comprising opposed limbs, said limbs being located on opposite sides of said internal partition.

2. A control device according to claim 1, wherein the ball means is interposed between said inclined surface and the push-button.

3. A control device according to claim 1, further comprising a ball-engaging member rigid with the push button, said ball means being interposed between said inclined surface and said ball-engaging member 4. A control device comprising a housing, a traction element slidable in the housing, said traction element being securable to an elongate control element, and said traction element having means defining an inclined surface, ball means cooperating with said inclined surface, and pushbutton means slidable in the housing and actuatable to cause the traction element to be displaced by interaction between the ball means and said inclined surface said housing having means defining first and second bores, and said traction element having first and second end portions located within said bores, said first end portion being securable to an enlarged head of said elongate control element whereby said head moves in said first bore to guide said first end portion, and said second end portion comprises means defining an aperture, and a ball received in said aperture and in said second bore, whereby the ball moves in the second bore to guide said second end portion.

5. A control device according to claim 4 wherein the ball means is interposed between said inclined surface and the pushbutton.

6. A control device according to claim 4, further comprising a ball-engaging member rigid with the pushbutton, said ball means being interposed between said inclined surface and said ball-engaging member.

* * * * *